United States Patent [19]
Break

[11] Patent Number: 5,404,779
[45] Date of Patent: Apr. 11, 1995

[54] SAW TABLE WITH COMPOUND MOVEMENT OF SAW

[75] Inventor: Douglas G. Break, Livonia, Mich.

[73] Assignee: Tapco Products Company, Inc., Plymouth, Mich.

[21] Appl. No.: 73,881

[22] Filed: Jun. 9, 1993

[51] Int. Cl.⁶ .................. B23D 45/02; B23D 45/14; B27B 5/20

[52] U.S. Cl. .................. 83/471.3; 83/473; 83/477.1; 83/486.1; 83/581

[58] Field of Search .................. 83/473, 471.3, 477, 83/477.1, 477.2, 486.1, 574, 581, 485, 486

[56] References Cited

U.S. PATENT DOCUMENTS

| | | | |
|---|---|---|---|
| 2,630,146 | 3/1953 | Van Tuyl | 83/471.3 X |
| 3,302,669 | 2/1967 | Edler | 83/471.3 |
| 3,331,406 | 7/1967 | Christophel | 83/471.3 |
| 3,602,987 | 9/1971 | Miller | 83/471.3 X |
| 3,821,918 | 7/1974 | Niehaus | 83/471.3 |
| 4,152,961 | 5/1979 | Batson | 83/471.3 |
| 4,197,775 | 4/1980 | Handler | 83/471.3 |
| 4,448,102 | 5/1984 | Thornton | 83/471.3 X |
| 4,452,117 | 6/1984 | Brickner | 83/471.3 X |
| 5,054,352 | 10/1991 | Fushiya et al. | 83/471.3 X |

*Primary Examiner*—Eugenia Jones
*Assistant Examiner*—Clark F. Dexter
*Attorney, Agent, or Firm*—Barnes, Kisselle, Raisch, Choate, Whittemore & Hulbert

[57] ABSTRACT

A portable saw table comprising a saw track pivotally supported on a saw table for guiding a slide plate on which a portable power saw having a rotary blade is mounted for guiding the saw as it is moved along the track to cut a workpiece. An adjustable mounting assembly supports the portable saw in a plurality of angularly adjusted positions such that the plane of the saw blade is at an angle to the slide plate and the periphery of the cutting edge of the saw blade is maintained substantially in the same kerf line in the saw table that supports the workpiece at substantially the same depth in each of the adjusted positions. The mounting assembly also supports the saw for use in a saw chopping mode.

12 Claims, 6 Drawing Sheets

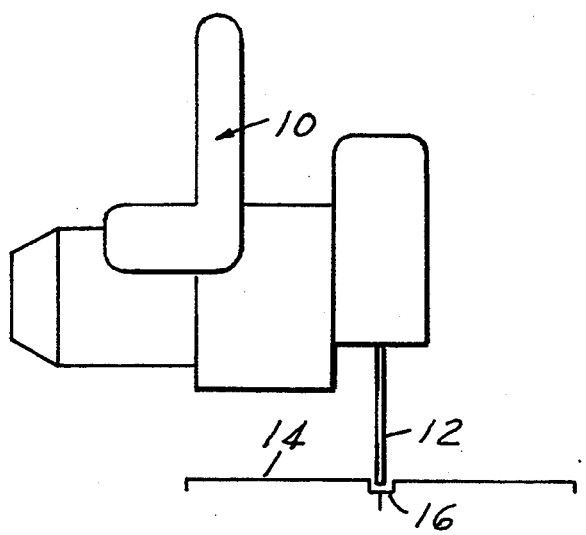
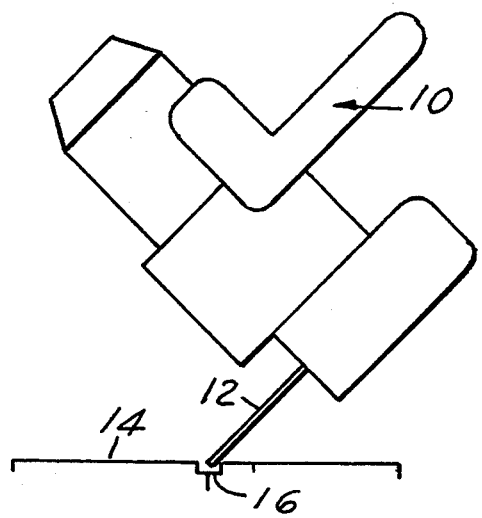
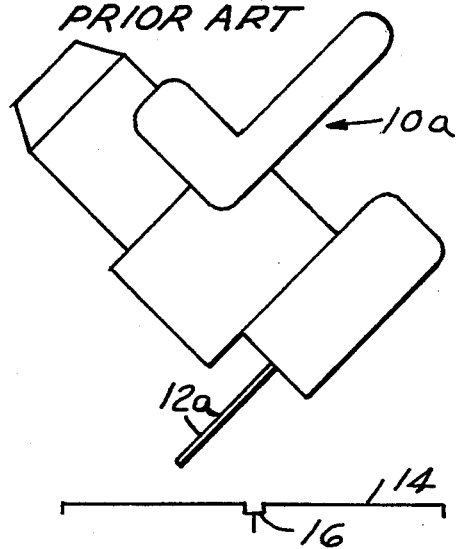
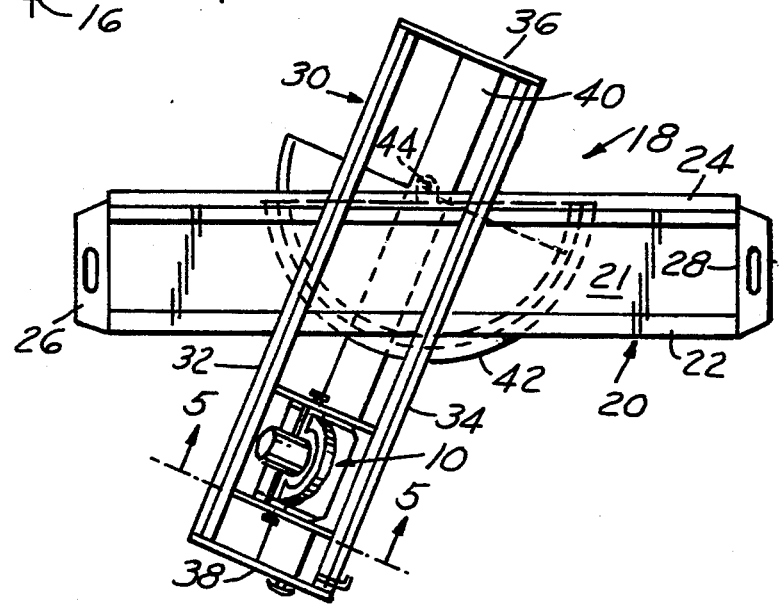

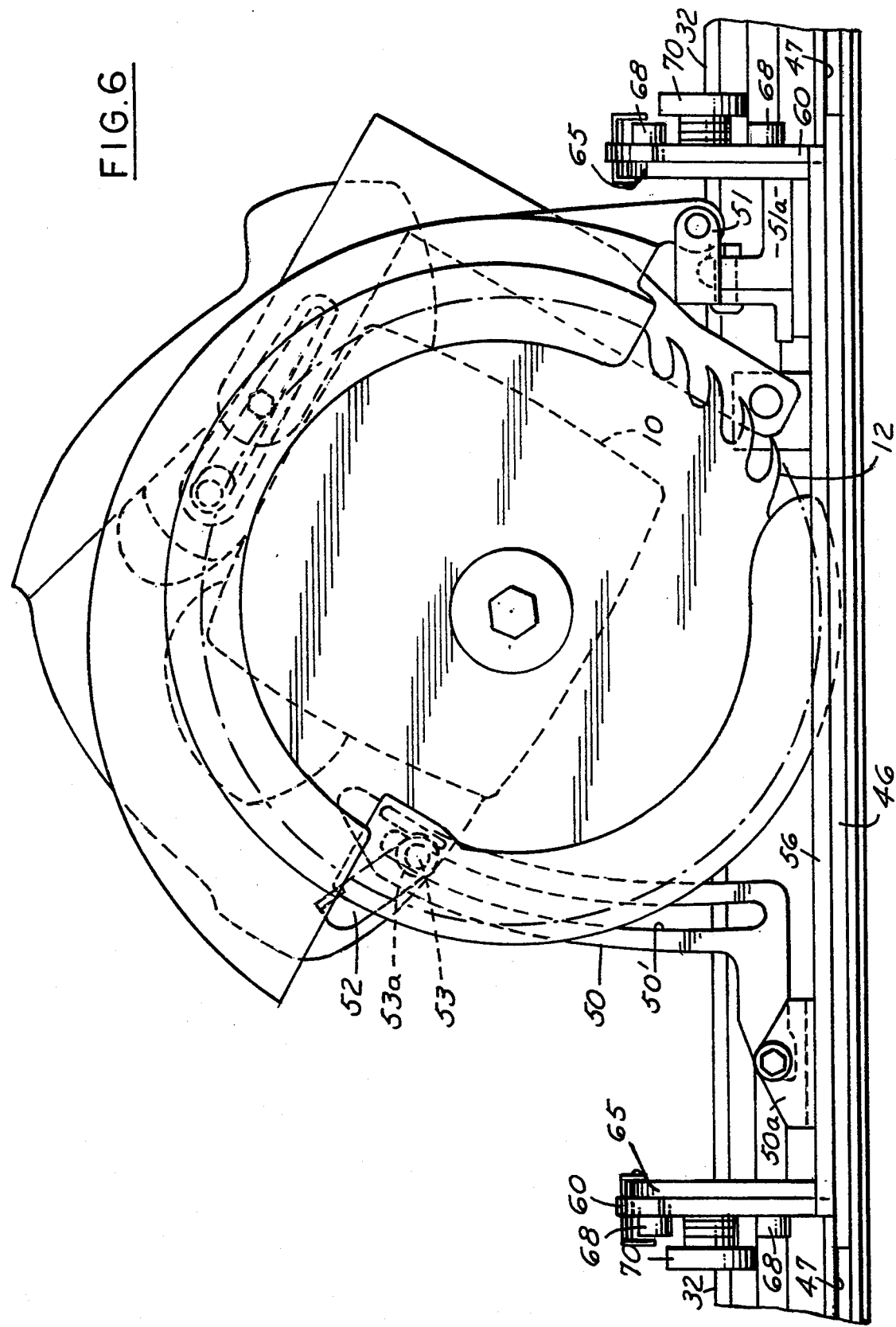

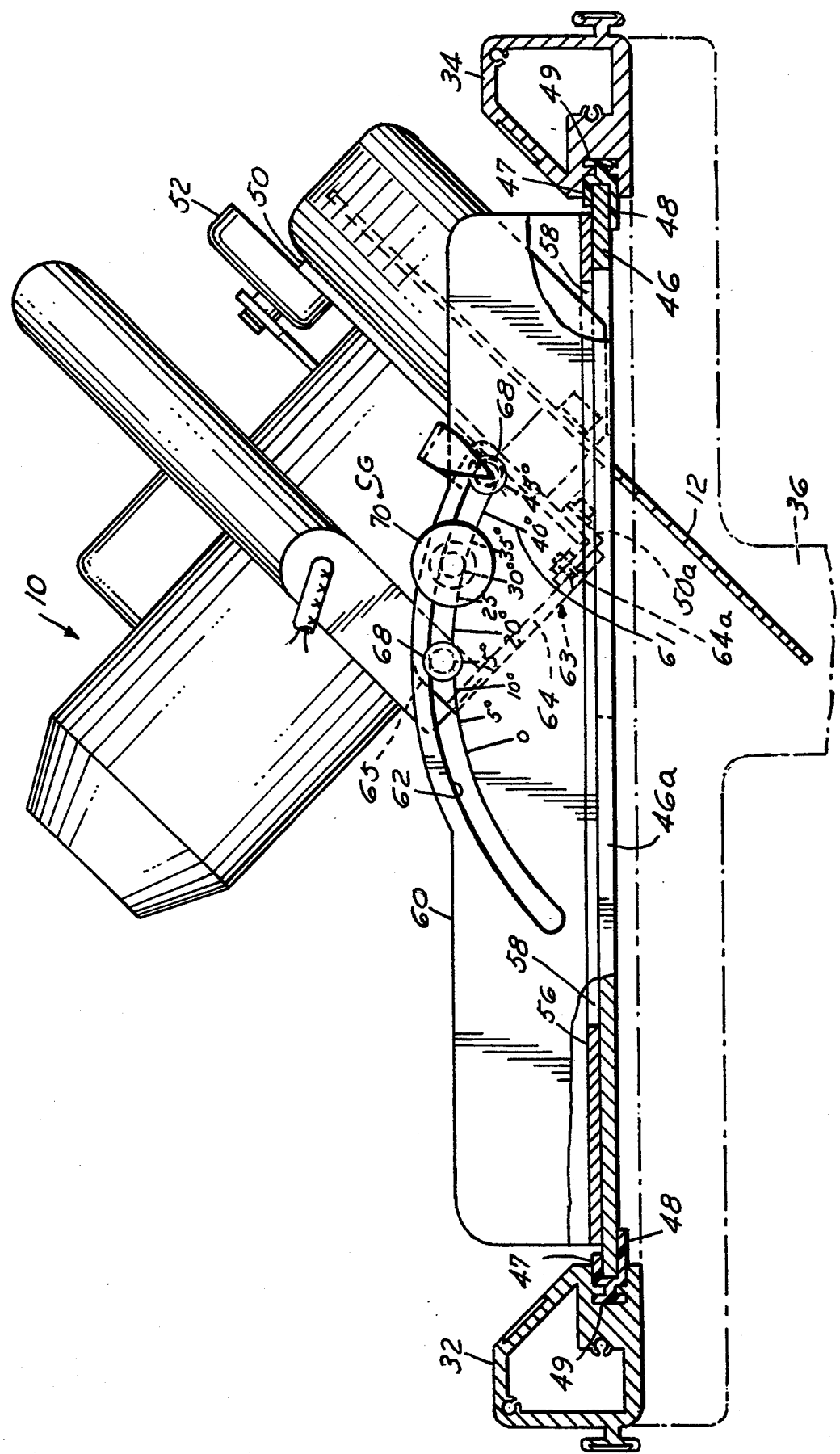

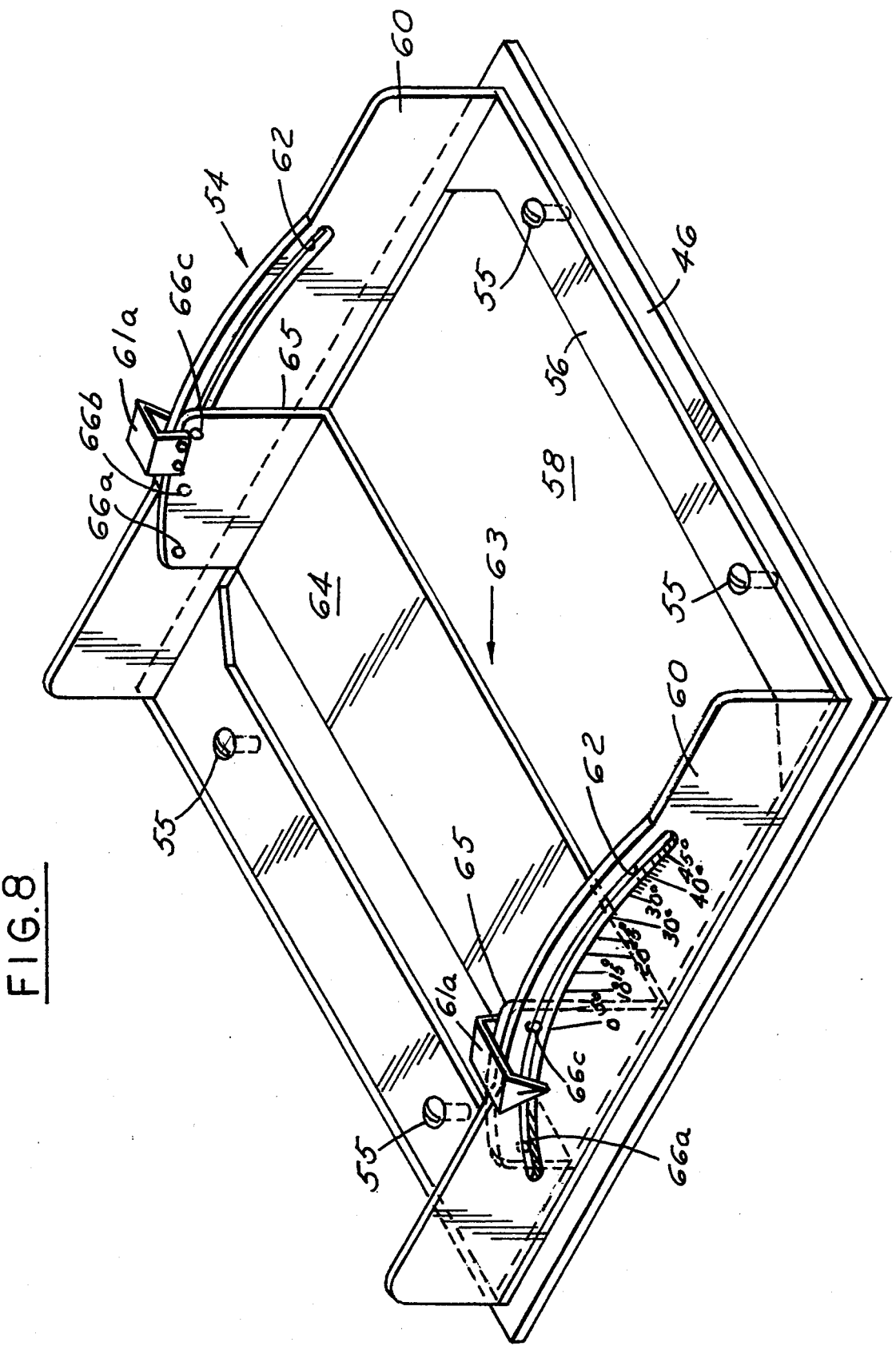

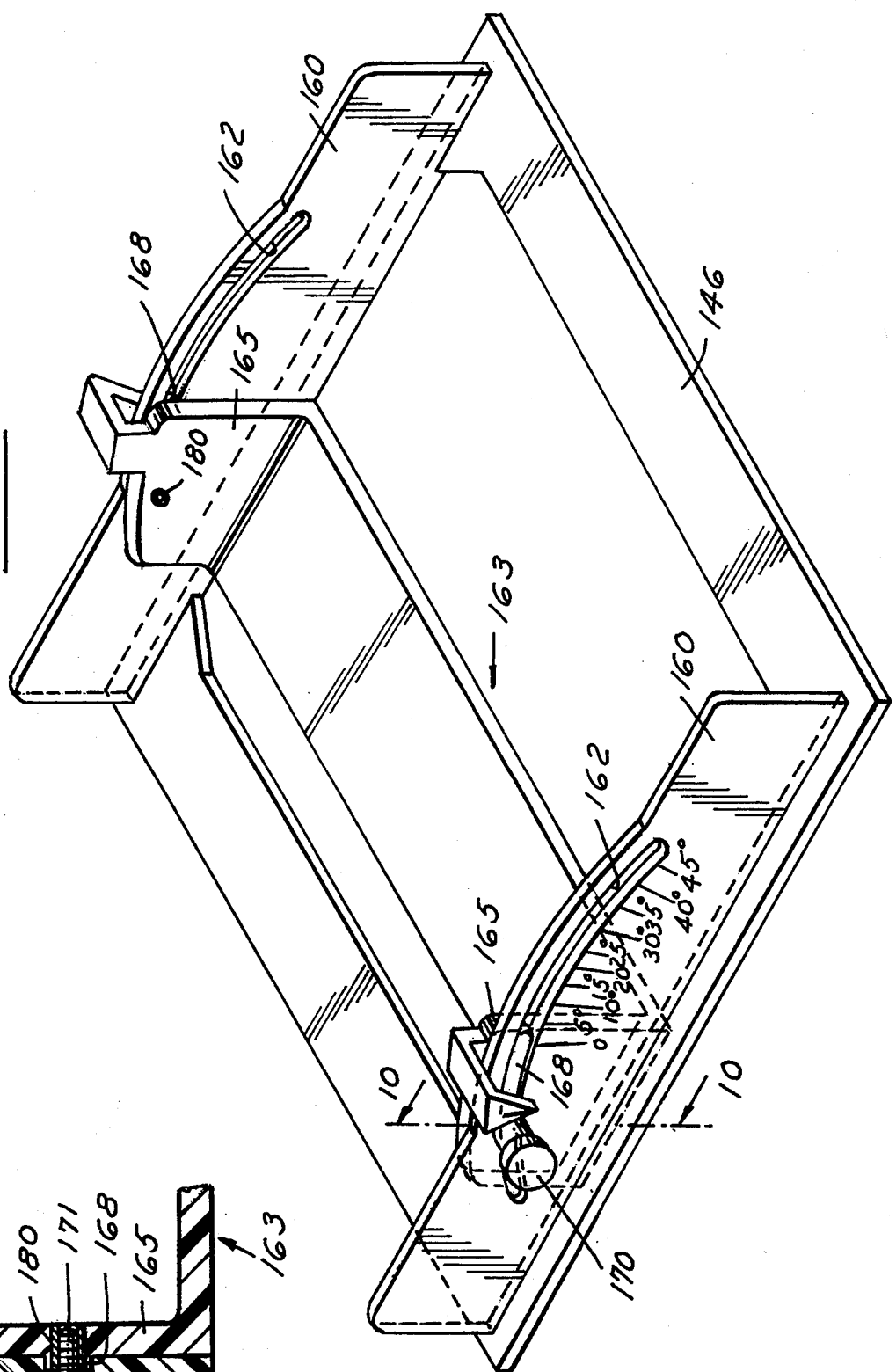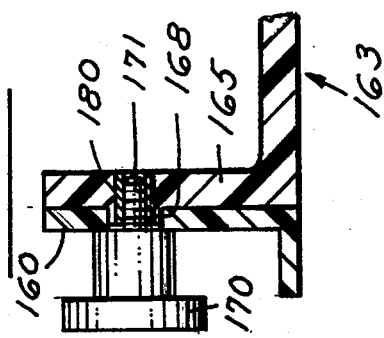

5,404,779

SAW TABLE WITH COMPOUND MOVEMENT OF SAW

This invention relates to a portable saw table utilizing a portable Dower saw having a rotary blade.

BACKGROUND OF THE INVENTION

Portable saw tables are commonly used at building sites. Typical patents showing portable saw tables are U.S. Pat. Nos. 3,821,918, 4,197,775 and 4,452,117. U.S. Pat. Nos. 4,197,775 and 4,452,117 show a saw table, a saw track and a portable saw movable along the saw track but do not allow for tilting of the saw for angular movement transversely of the saw track.

Stationary prior art saw tables are known which include a track along which the saw is moved and also provide for tilting of the saw for angular movement transversely of the track. However, as the saw is tilted, it pivots about the point of connection to the table causing the .peripheral edge of the rotary saw blade to be raised out of position and moved out of the kerf line in the saw table that supports the workpiece. After the saw is tilted, the user then must readjust the workpiece manually in an effort to place the workpiece along the same kerf line and at the same depth. Readjustment of the workpiece may result in an inaccurate cut of the workpiece. Additionally, such prior saw tables are not portable.

Among the objectives of the present invention are to provide a portable saw table which utilizes a power tool such as a portable saw movable along a saw track and which will provide a wide range of angular positions of the saw blade transversely of the saw track, while maintaining the plane of the saw blade with its cutting edge substantially in the same kerf line and at the same depth; wherein the adjustable mounting assembly is relatively low in cost; and which allows the portable saw to perform a chopping operation.

In accordance with the invention, the portable saw table is provided comprising a saw track pivotally supported on a saw table and a slide plate on which a portable power saw having a rotary blade is mounted for guiding the saw as it is moved along the saw track to cut a workpiece. An adjustable mounting assembly supports the portable saw in a plurality of angularly adjusted positions such that the plane of the saw blade is at an angle to the saw plate and the cutting edge of the saw blade is maintained substantially in the same kerf line in the saw table that supports the workpiece at substantially the same depth in each of the adjusted positions. The mounting assembly also supports the saw for use in a saw chopping mode.

BRIEF DESCRIPTION OF THE DRAWINGS

FIG. 1 is a schematic view of the portable saw in the vertical position.

FIG. 2 is a schematic view of the portable saw in the tilted position in accordance with the present invention.

FIG. 3 is a schematic view of a prior art portable saw adjusted to a tilted position.

FIG. 4 is a plan view of a portable saw table in accordance with the present invention.

FIG. 6 is a fragmentary view taken through line 6—6 of FIG. 5.

FIG. 7 is a side view of the portable saw tilted to a different angular position.

FIG. 8 is a perspective view of a portion of the portable saw table.

FIG. 9 is a perspective view of a portion of a modified portable saw.

FIG. 10 is a sectional view taken along the line 10—10 in FIG. 9.

DETAILED DESCRIPTION OF THE INVENTION

Figure 5:
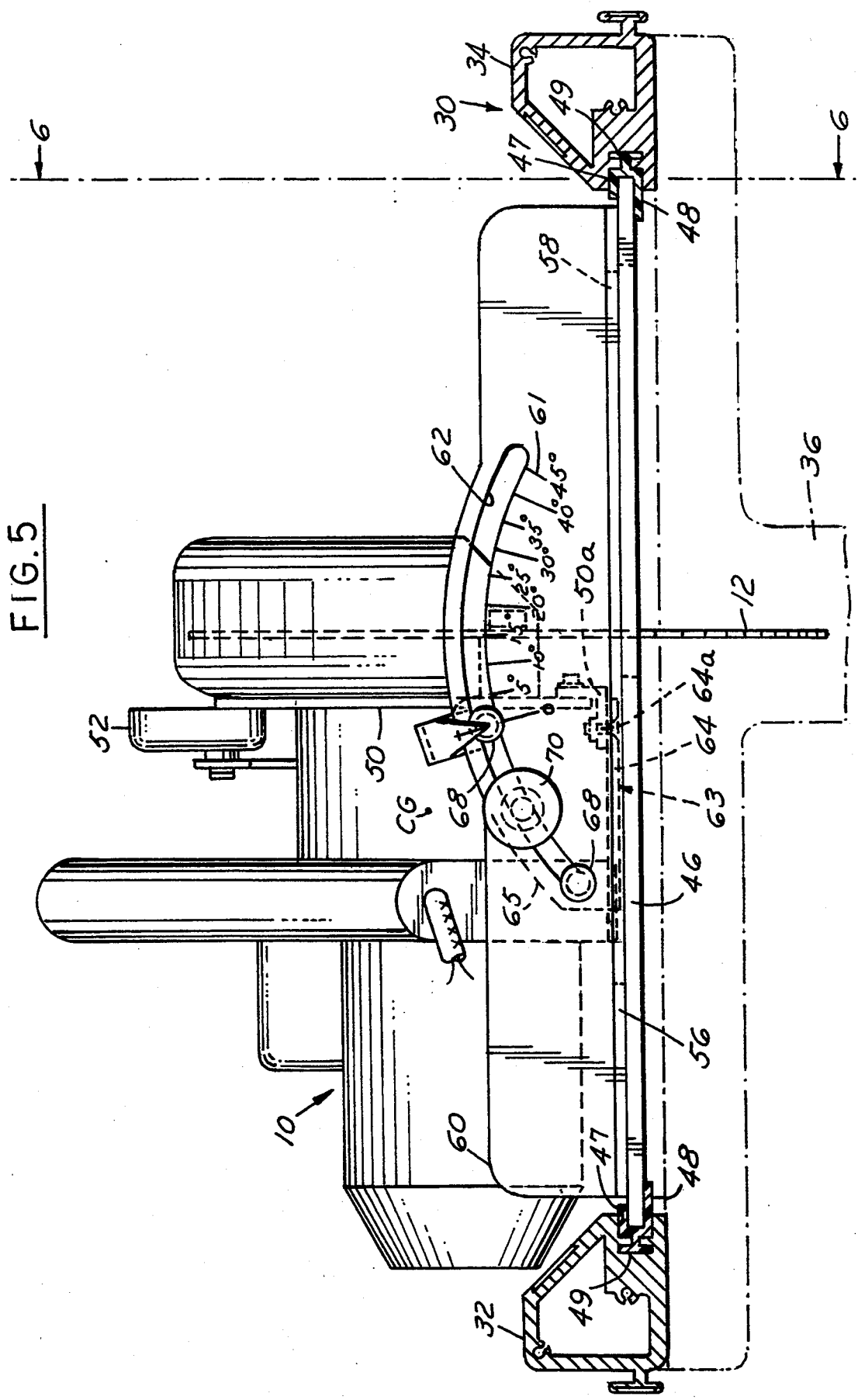
FIG. 5 is a side view of a portion of the portable saw table showing the portable saw mounted in the vertical position.

Referring to the schematic drawings of FIGS. 1–3, a portable power saw 10 having a rotary saw blade 12 is shown in FIG. 1 in the vertical position. During a cutting operation, the worktable 14 is formed with a groove 16 known as a kerf line which accommodates the edge of the saw blade 12 as it cuts through a workpiece (not shown). The groove 16 is representative of a kerf line. FIG. 2 illustrates the position in which the portable saw 10 of the present invention is adjusted in an angular position and the periphery of the cutting blade 12 is maintained substantially in the same kerf line at substantially the same depth. A prior art saw 10a is shown tilted in FIG. 3, where the cutting blade 12a is at an angle. It can be seen that the cutting edge of the saw blade 12a is elevated and displaced laterally such that the cutting edge of the blade 12a is located a distance away and above the groove 16 in the worktable 14 and not in the same kerf line at substantially the same depth.

Referring to FIG. 4, in a preferred form, a portable table saw 18 comprises a worktable assembly 20 and a saw track 30 pivotally mounted to the worktable assembly 20 by a pivot mount 44. The worktable assembly 20 comprises a worktable 21 with front and back extensions 22, 24, shown in the retracted position to expand the width of the worktable assembly 20. The length of the table may be expanded by extensions 26, 28. The extensions 26, 28 are preferably telescopically received within the worktable 21.

The saw track 30, seen most clearly in FIGS. 4 and 5, include a pair of tracks 32, 34 mounted at each end by substantially T-shaped track supports 36, 38. A track base 40 is connected to and extends between the bottom of the track supports 36, 38 such that the worktable assembly 20 is positioned between the track base 40 and the track supports 36, 38.

Referring to FIG. 5, the portable saw 10 is adjustably mounted on the saw slide 46 which is in the form of a plate by a saw guide and mounting brackets discussed below. Vinyl guides 48 with a T-shaped projection 49 are provided within each saw track 32, 34 to allow for sliding movement of the saw slide 46 within grooves 47 in the tracks 32, 34.

The aforementioned portable saw table is substantially identical to that shown in the aforementioned application Ser. No. 07/840,319, filed Feb. 24, 1992, incorporated herein by reference.

Referring to FIGS. 6–8, an adjustable mounting assembly is provided for mounting the portable saw 10 in a plurality of adjusted positions such that it may be tilted relative to the saw slide 46 and, in turn, the saw track 30 about an axis substantially parallel to the longitudinal axis of the saw track 30 while maintaining the periphery of the cutting edge of the rotary saw blade 12 in the same horizontal and vertical positions relative to the kerf line.

The adjustable mounting assembly comprises a plate 56 mounted on the saw slide 46 by any securing means such as bolts 55 as best seen in FIG. 8. The saw slide has a central opening 46' over which the plate 56 is mounted. The plate 56 has diametrically opposed sidewalls 60 and a central opening 58 that communicates with the opening 46' in the saw slide 46. The construction thus far is described as comprising two separate pieces, i.e., the saw slide 46 and the plate 56. However, it is to be understood that only a single piece construction may be used where the plate 56 actually serves as a saw slide having opposed ends that slide along the grooves 47 in the saw tracks 32,34.

An arcuate guide slot 62 is provided in each of the sidewalls. Each guide slot 62 has a constant radius of curvature. Each sidewall 60 may have indicia 61 (FIG. 7) along the slot 62 to indicate the degree of angular movement of the portable saw 10, as presently described.

A movable support 63 is provided having a base wall 64 and upstanding opposed walls 65. The base wall 64 normally rests within the opening 58 such that the upper surface of the base wall 64 is parallel to the upper surface of the plate 56. The portable saw 10 is supported on the base wall 64, as presently described.

Each upstanding wall 65 of the support 63 has a plurality of openings 66a, 66b, 66c, the centers of which lie on an arc having a radius of curvature that corresponds to the radius of curvature of slot 62. Guide followers 68 (FIG. 7) are provided within the two outermost openings 66a, 66c and a lock knob 70 with a threaded shaft is threaded into central opening 66b. Both guide followers 68 and the lock knob 70 are received within the guide slot 62 to guide the portable saw 10 as it is tilted. The portable saw 10 is mounted on the base 64 of the support 63 by nuts and bolts 64a, after removal of the conventional shoe on the portable saw.

The portable saw 10 is mounted such that when the plane of the saw blade 12 is vertical, it intersects the highest point of the slots 62 (FIG. 5). In this manner, the center of gravity CG of the portable saw 10 is located centrally of the guide followers 68. This prevents the portable saw 10 and the support 62 from binding within the slots 62 during tilting and allows one-handed adjustment of the portable saw 10.

The portable saw 10 may thus be tilted about the cam slots 62 through the support 63 as seen in FIG. 7. When adjustment is necessary, each lock knob 70 is loosened and the portable saw 10 along with the support 63 is then tilted. During the tilting movement, the portable saw 10 is pivoted about the cutting edge of the saw blade 12 as the guide followers 68 move along the guide slots 62 to maintain the edge of the saw blade 12 in the same kerf line at substantially the same depth. When the portable saw 10 reaches the desired position as indicated by the indicia 61 on the sidewalls 60 and indicator 61a on the walls 65 of the support 63, lock knob 70 is then tightened to secure the portable saw 10 in the adjusted position.

In accordance with the invention, the portable saw 10 is also mounted for a chopping action. The portable saw 10 is connected at one end by a pivot 51 to the mounting bracket 51a. The axis of the pivot 51 is at ninety degrees to the plane of the saw blade 12. The bracket 50 has an arcuate slot 50'. The portable saw 10 includes a bolt 53 that is captured within the slot 50' and is retained therein by a nut 53a. Thus, the portable saw 10 may be pivoted about the pivot 51 and the bolt 53 is guided within the slot 50' during a chopping operation. A manually operated function lock 52 secures the portable saw to prevent movement when a chopping action is not desired.

In the form shown in FIGS. 9 and 10, the plate 146 and support 163 are made of plastic. In place of guide followers 68, a single arcuate guide portion 168 is formed integrally on each of the walls 165 and has the same curvature as the associated slot 162. A threaded metal insert 180 is molded midway of the ends of each guide 168 and a knob 170 has a threaded shaft 171 extending into insert 180.

It can be seen that there has been provided a portable saw table wherein a portable saw is mounted for guided movement along a saw track by an adjustable mounting assembly which provides a wide range of angular positions of the saw blade transversely of the saw track. The adjustable mounting assembly allows the portable saw 10 to be tilted so that the cutting edge of the saw blade 12 remains substantially in the same kerf line at substantially the same depth. The adjustable mounting assembly also provides for the portable saw 10 to be pivotally guided through a chopping action.

I claim:

1. A portable saw table for a portable power saw comprising
    a table base,
    a saw track pivotally mounted on said table base for guiding said portable power saw as the saw is moved along said saw track to cut a workpiece along a kerf line,
    said saw having a portable power saw blade with a cutting edge wherein said saw blade forms a saw blade plane,
    pivot means on said table base for pivotally supporting said saw track on said table base,
    a saw slide slidably mounted on said saw track for slidably supporting the portable power saw on said saw track,
    a saw mounting means constructed and arranged for adjustably mounting the portable power saw on said saw slide for angular movement transversely of said saw track through a plurality of adjusted positions wherein the saw blade plane extends substantially through said kerf line in the workpiece in each of said angularly adjusted positions,
    said saw mounting means comprising
    a first mounting means having a central opening therethrough,
    a second mounting means for supporting said portable saw positioned within the central opening,
    guide means on said first mounting means,
    guide follower means on the second mounting means positioned within said guide means such that said second mounting means is adjustable relative to said first mounting means about said guide means to adjust said portable saw in said plurality of angular positions,
    said first mounting means comprising
    opposed side walls, each said side wall having an arcuate guide slot defining said guide means, and
    said second mounting means comprising a support means having a base and upstanding walls extending from said base, at least a portion of said second mounting means being positioned within said central opening in said first mounting means and wherein the portable power saw is mounted on said second mounting means such that the cutting edge of the blade extends through the central opening of said first mounting means, said guide follower means being positioned in the upstanding walls of said second mounting means for guided movement within the arcuate slots such that the portable saw is adjusted to said plurality of angular positions, and lock means on the upstanding walls for securing the support means in one of said angularly adjusted positions.

2. The portable saw table as in claim 1 wherein said side walls of said first mounting means have indicia thereon to indicate the angle of adjustment of the portable saw.

3. The portable saw table as in claim 1 wherein the portable saw is adjustable through a range of about 45°.

4. The portable saw table as in claim 1 wherein said guide follower means comprises spaced guide followers located approximately equidistant as measured in a lateral direction along the saw blade from the center of gravity of the portable power saw.

5. The portable saw table as in claim 1 comprising pivotal mounting means for pivotally mounting said portable saw on said saw mounting means for a chopping action.

6. The portable power saw table as in claim 5 wherein said pivotal mounting means comprises a pivot mount for mounting said portable saw to said saw mounting means at one end, a bracket having a slot mounted to said saw mounting means at another end of said portable saw, a bolt on said portable power saw received within said slot, and means for retaining said bolt within said slot.

7. The portable saw table set forth in any one of claims 1–6 wherein said guide means comprises an arcuate track on one of said mounting means and an arcuate guide follower on the other of said mounting means.

8. The portable saw table set forth in any one of claims 1–6 wherein said guide follower means comprises an arcuate member having substantially the same curvature as said arcuate guide slot.

9. The portable saw table set forth in claim 8 wherein said first and second mounting means are made of plastic.

10. A portable saw in combination with a support plate assembly, said portable saw comprising a rotary saw blade having a plane and a peripheral cutting edge defining a kerf line, said support plate assembly comprising a first plate means having a central opening therethrough, a second plate means supporting said portable saw with the periphery of the saw blade in a predetermined position relative to said second plate means, said first plate means and said second plate means each having opposite sides, support means supporting said second plate means for adjustment of the plane of the saw blade relative to said first plate means with said opposite sides of said second plate means adjacent said opposite sides of said first plate means, said support means supporting said second plate means on said first plate means and comprising dual arcuate guide means on said opposite sides of one of said plate means and dual arcuate guide follower means on said opposite sides of the other of said plate means, said arcuate guide means having a configuration such that the plane and the peripheral edge of the saw blade are maintained in the same kerf line throughout the adjustment of the plane of the saw blade by movement of the second plate means relative to the first plate means.

11. The portable saw set forth in claim 10 wherein said first plate means and second plate means are made of plastic material.

12. A portable saw table for a portable saw comprising a table base, a saw track pivotally mounted on said table base for guiding said portable power saw as the saw is moved along said saw track to cut a workpiece along a kerf line, said saw having a saw blade and a cutting edge wherein said saw blade forms a saw blade plane, pivot means on said table base for pivotally supporting said saw track on said table base, a saw slide for slidably supporting the portable power saw on said saw track, said saw slide slidably mounted on said saw track wherein said saw track includes spaced tracks mounted on each end to track supports, a track base on which said track supports are mounted, a saw mounting means constructed and arranged for adjustably mounting the portable power saw on said saw slide for angular movement transversely of said saw track through a plurality of adjusted positions wherein the saw blade plane extends substantially through said kerf line in the workpiece in each of said angularly adjusted positions, said saw mounting means connected to said power portable saw and comprising a first mounting means having a central opening therethrough, a second mounting means for supporting said portable saw positioned within the central opening, said first mounting means comprising opposed side walls, each said side wall having an arcuate guide slot, said second mounting means comprising a support means having a base and upstanding walls extending from the base and positioned adjacent said opposed side walls of said first mounting means and, wherein the portable power saw is mounted on said second mounting means such that the cutting edge of the blade extends through the central opening of said first mounting means, guide follower means on each of said upstanding walls of said second mounting means engaging said arcuate slots such that said second mounting means is adjustably mounted on said first mounting means so that the portable saw is adjustable to said plurality of angular positions, and lock means on said upstanding walls for securing the first and second mounting means in one of said adjusted positions.

* * * * *